March 17, 1931.　　　A. H. WILSON　　　1,797,034
SAFETY DEVICE FOR ELEVATORS
Filed April 29, 1929
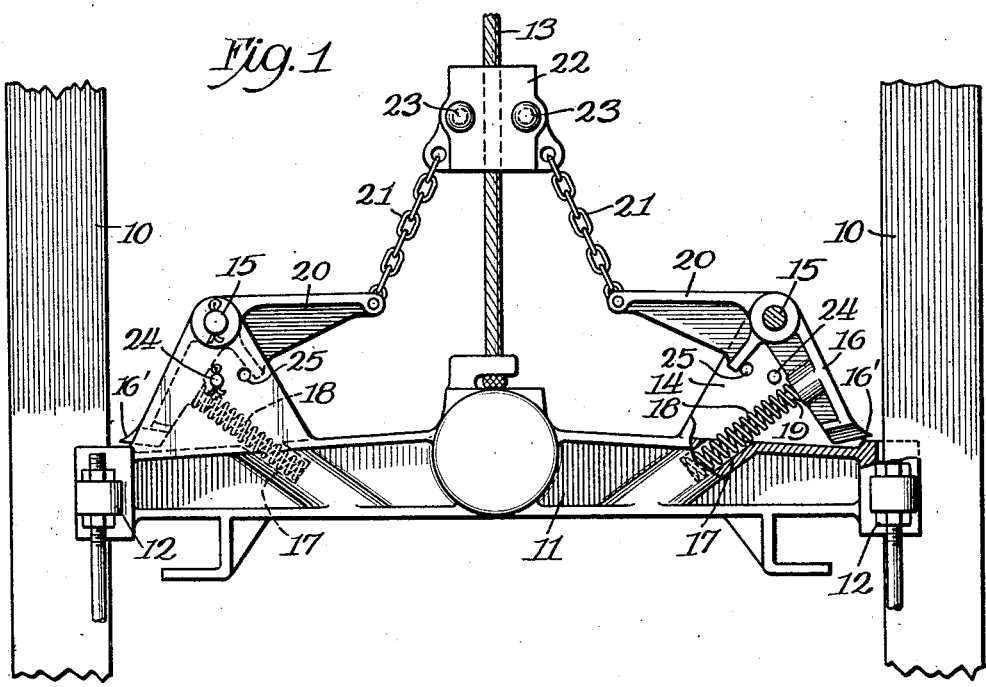
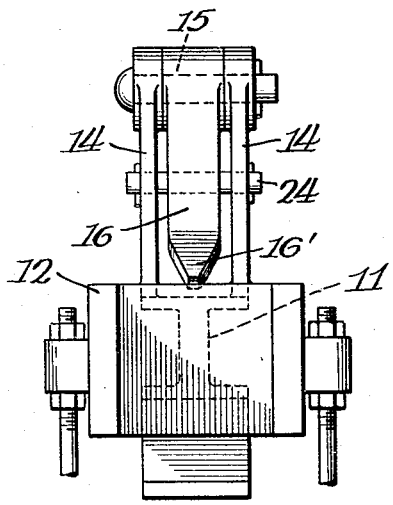
Inventor
Alexander H. Wilson
By Fisher, Clapp, Soans + Pond, Attys.

Patented Mar. 17, 1931

1,797,034

UNITED STATES PATENT OFFICE

ALEXANDER H. WILSON, OF OAK PARK, ILLINOIS, ASSIGNOR TO THOMAS ELEVATOR COMPANY, OF CHICAGO, ILLINOIS, A CORPORATION OF ILLINOIS

SAFETY DEVICE FOR ELEVATORS

Application filed April 29, 1929. Serial No. 359,010.

This invention relates to safety devices for elevators, being designed more especially for use on what are known as building material hoists, to prevent a loaded cage from dropping in the event of breaking or slackening of the hoisting cable while the loaded cage is being elevated. Hoists of this character usually employ vertical wooden cage guides that are slidingly engaged by bifurcated shoes on the ends of the usual top yoke of the cage to which the hoisting cable is attached, and the principal object of the invention is to provide a very simple, inexpensive and efficient safety device on the cage, and preferably on the top yoke thereof, that is normally held idle by a connection to the cable, but that, if the cable breaks or slackens under load, is instantly spring-impelled into biting engagement with the cage-guides to arrest the descent of the cage.

One simple and approved embodiment of the invention is illustrated in the accompanying drawing, in which Fig. 1 is a front elevation of a portion of the cage, cage-guides, and hoisting cable of a building material hoist, showing my improved safety device applied thereto, a portion of the yoke of the cage being broken away and in section;

Fig. 2 is an enlarged end elevation of the yoke and one of the safety dogs mounted thereon.

In the drawing, 10 designates each of the vertical cage-guides which, in building material hoists, is usually a square wooden rail, 11 designates the top yoke of the cage formed at its ends with U-shaped shoes 12 slidingly embracing the inner portions of the guides 10, and 13 designates the hoisting cable attached to the center of the yoke 11.

Cast with or attached to the top of the yoke 11 just behind the shoes 12 are a pair of upstanding forked lugs 14, in the upper end of each of which is suspended on a pivot pin 15 a downwardly and outwardly inclined dog 16 that is tapered and narrowed at its free end to form a tooth 16' adapted, when the dog is forced outwardly, to bite into the inner side of the adjacent guide rail 10.

In the upper side of the yoke 11 are cast a pair of upwardly and outwardly inclined sockets 17 in which are footed a pair of thrust springs 18, the upper ends of which bear against the inner sides of the dogs 16 substantially at right angles to the latter and are held in place by centering mandrels 19. Manifestly, these springs constantly urge the dogs outwardly in biting engagement with the cage-guides 10.

Integral with or attached to the dogs 16 on the other side of their pivots 15 are a pair of inwardly extending tail-pieces 20, the free ends of which are connected by links, such as short chains 21, to a clamp block 22 that is clamped on the cable 13 at a suitably adjusted position by clamp screws 23. The clamp block 22 is placed at such a height on the cable that the tension of the links 21 on the tail-pieces 20 of the dogs will hold the latter in the retracted position shown in Fig. 1, against the urge of the springs 18.

From the foregoing, it will be seen that, should the cable 13 break or slacken at a point above the clamp block 22, the tension of the links 21 will cease, and the springs 18 will instantly thrust the dogs outwardly into engagement with the guides 10, and the gravity of the cage, as it starts to drop, will cooperate with the springs 18 in forcing the teeth of the dogs into the guides, and thus locking the cage against further descent.

In assembling the device, it is convenient to first mount the dogs and their springs on the yoke, and then adjust the clamp block to the proper height on the cable. To facilitate this latter operation, I provide a simple means for temporarily holding the dogs retracted, the same consisting of a pin 24 that may be inserted in a hole 25 in the lug 14, said pin engaging with the underside of the tail-piece 20 to thereby hold the dog in its retracted position. When the stop pin 24 is not required, it may conveniently be disposed in an adjacent hole in the lug for handy access, as shown in Fig. 1.

From the foregoing, it will be apparent that the safety device of the present invention comprises but a few simple parts conveniently mounted on the cage yoke and hoisting cable, and acting instantly and automatically in case of breakage or slackening of the cable, to arrest the further descent of the cage.

I claim:

1. In combination with the vertical cage-guides, cage, and hoisting cable of an elevator, a safety device comprising upstanding lugs on the top yoke of the cage, a pair of downwardly and outwardly inclined dogs pivoted on said lugs and each formed with a tooth on its free end adapted to bite into the adjacent guide, springs urging said dogs into engagement with the guides, tail-pieces on said dogs, a clamp on said cable, links connecting said clamp to said tail-pieces, and removable stops on said lugs adapted to hold said dogs retracted against the urge of said springs while adjusting and securing the clamp on the cable.

2. In an elevator of the type described, the combination with vertical cage guides, a cage, and a hoisting cable directly connected at its lower end to the top yoke of the cage centrally of said yoke, of a safety device comprising a pair of dogs pivotally mounted on the top yoke of the cage and each formed with a tooth on its free end adapted to bite into the adjacent guide, independently acting springs normally urging said dogs into biting engagement with the guides, tail pieces on said dogs, and independent connections from said tail pieces to the cable holding said dogs disengaged from the guides against the urge of said springs.

3. In an elevator of the type described, the combination with vertical cage guides, a cage, and a hoisting cable directly connected at its lower end to the top yoke of the cage centrally of said yoke, of a safety device comprising a pair of dogs pivotally mounted on the top yoke of the cage and each formed with a tooth on its free end adapted to bite into the adjacent guide, independently acting thrust springs footed on said yoke and normally urging said dogs into biting engagement with the guides, tail pieces on said dogs, a clamp on said cable, and independent links connecting the inner ends of said tail pieces to said clamp.

ALEXANDER H. WILSON.